US012741470B2

(12) United States Patent
Nakamura

(10) Patent No.: US 12,741,470 B2

(45) Date of Patent: Sep. 22, 2026

(54) INK-RECEIVING BODY AND RECORDING METHOD

(71) Applicant: SEIKO EPSON CORPORATION, Tokyo (JP)

(72) Inventor: Tasuku Nakamura, Matsumoto (JP)

(73) Assignee: SEIKO EPSON CORPORATION (JP)

(*) Notice: Subject to any disclaimer, the term of this patent is extended or adjusted under 35 U.S.C. 154(b) by 175 days.

(21) Appl. No.: 18/925,560

(22) Filed: Oct. 24, 2024

(65) Prior Publication Data

US 2025/0135786 A1 May 1, 2025

(30) Foreign Application Priority Data

Oct. 25, 2023 (JP) ................................ 2023-182925

(51) Int. Cl.

| | |
|---|---|
| ***B41J 2/175*** | (2006.01) |
| ***B32B 1/00*** | (2024.01) |
| ***B32B 27/08*** | (2006.01) |
| ***C09D 11/107*** | (2014.01) |
| ***C09D 11/322*** | (2014.01) |
| ***C09D 11/38*** | (2014.01) |

(52) U.S. Cl.

CPC ....... *B41J 2/17513* (2013.01); *B41J 2/17553* (2013.01); *C09D 11/107* (2013.01); *C09D 11/322* (2013.01); *C09D 11/38* (2013.01); *B32B 1/00* (2013.01); *B32B 27/08* (2013.01); *B32B 2255/10* (2013.01); *B32B 2255/205* (2013.01); *B32B 2307/7242* (2013.01); *B32B 2439/00* (2013.01); *B41J 2002/17516* (2013.01)

(58) Field of Classification Search

CPC .. C08J 3/05; C08J 3/03; C09D 11/322; C09D 11/38; C09D 175/04; B41J 2/01

See application file for complete search history.

(56) References Cited

U.S. PATENT DOCUMENTS

| | | | | |
|---|---|---|---|---|
| 12,024,637 | B2 * | 7/2024 | Sato ........................ | C09D 11/38 |
| 2007/0242118 | A1 | 10/2007 | Koganehira et al. | |
| 2014/0002539 | A1 * | 1/2014 | Goto ........................ | C09D 11/38 106/31.75 |
| 2014/0204156 | A1 * | 7/2014 | Gotou ...................... | C09D 11/40 347/100 |
| 2014/0308516 | A1 * | 10/2014 | Yonezaki .......... | C08F 220/1808 524/561 |
| 2017/0369725 | A1 * | 12/2017 | Mitsuyoshi ............ | C09D 11/38 |

(Continued)

FOREIGN PATENT DOCUMENTS

| | | |
|---|---|---|
| JP | 2007-297596 A | 11/2007 |

*Primary Examiner* — John P Zimmermann

(74) *Attorney, Agent, or Firm* — Harness, Dickey & Pierce, P.L.C.

(57) ABSTRACT

An ink-receiving body includes an ink jet ink composition and a container to receive the ink jet ink composition. In the ink-receiving body described above, the ink jet ink composition is an aqueous ink containing a pigment and a surfactant, the pigment includes at least two types of pigments having chemical structures classified into respective different groups, the surfactant includes a polysiloxane-based surfactant having an HLB value of 10 or more and an acetylene glycol-based surfactant having an HLB value of 6 to 10, and the received ink jet ink composition contains a dissolved nitrogen amount of 5 ppm or more.

18 Claims, 8 Drawing Sheets

<TABLE 1>

| | | | | EXAMPLE 1 | EXAMPLE 2 | EXAMPLE 3 | EXAMPLE 4 | EXAMPLE 5 | EXAMPLE 6 |
|---|---|---|---|---|---|---|---|---|---|
| SOLID CONCENTRATION OF INK COMPOSITION (PERCENT BY MASS) | PIGMENT DISPERSION LIQUID | A (PERINONE-BASED PIGMENT) | PO 43 | 3.0 | 3.0 | 3.0 | – | 3.0 | 3.0 |
| | | B (AZO-BASED PIGMENT) | PR 150 | 1.0 | – | – | 3.0 | 1.0 | 1.0 |
| | | C (QUINACRIDONE-BASED PIGMENT) | PR 122 | – | 1.0 | – | 1.0 | – | – |
| | | D (AZO-BASED PIGMENT) | PR 242 | – | – | 1.0 | – | – | – |
| | SURFACTANT | POLYSILOXANE BASE | KF-640 (HLB VALUE: 14) | 0.5 | 0.5 | 0.5 | 0.5 | 0.2 | 1.5 |
| | | | FZ-2105 (HLB VALUE: 11) | – | – | – | – | – | – |
| | | | KF-6015 (HLB VALUE: 5) | – | – | – | – | – | – |
| | | ACETYLENE GLYCOL BASE | SURFYNOL 104E (HLB VALUE: 4) | – | – | – | – | – | – |
| | | | SURFYNOL SE (HLB VALUE: 6) | – | – | – | – | – | – |
| | | | SURFYNOL 440 (HLB VALUE: 8) | 0.2 | 0.2 | 0.2 | 0.2 | 0.2 | 0.2 |
| | | | SURFYNOL 465 (HLB VALUE: 13) | – | – | – | – | – | – |
| | ORGANIC SOLVENT | GLYCERIN (SP VALUE: 16.7) | | 10 | 10 | 10 | 10 | 10 | 10 |
| | | PROPYLENE GLYCOL (SP VALUE: 14.2) | | – | – | – | – | – | – |
| | | 1,2-HEXANEDIOL (SP VALUE: 12.2) | | 5 | 5 | 5 | 5 | 5 | 5 |
| | | DIETHYLENE GLYCOL MONOISOBUTYL ETHER (SP VALUE: 8.7) | | – | – | – | – | – | – |
| | pH ADJUSTER | TRIETHANOLAMINE | | 0.5 | 0.5 | 0.5 | 0.5 | 0.5 | 0.5 |
| | WATER | ION EXCHANGE WATER | | BALANCE | BALANCE | BALANCE | BALANCE | BALANCE | BALANCE |
| | TOTAL | | | 100 | 100 | 100 | 100 | 100 | 100 |
| | COMPOSITION RATIO | CONTENT A : CONTENT B | | 2.5 | 2.5 | 2.5 | 2.5 | 1 | 7.5 |
| | | CONTENT B : CONTENT C | | 0.04 | 0.04 | 0.04 | 0.04 | 0.04 | 0.04 |
| RECEIVING BODY | CONTAINER | 1 | | ○ | ○ | ○ | ○ | ○ | ○ |
| | | 2 | | | | | | | |
| | | 3 | | | | | | | |
| | | 4 | | | | | | | |
| | DISSOLVED NITROGEN | MEASUREMENT TIME AFTER FILLING (YEAR) | | 1 | 1 | 1 | 1 | 1 | 1 |
| | | DISSOLVED NITROGEN AMOUNT (ppm) | | 6 | 6 | 6 | 6 | 6 | 6 |
| EVALUATION | EJECTION EVALUATION | CONTINUOUS EJECTION PROPERTY | | A | A | A | A | B | A |
| | | CLOGGING RESISTANCE | | A | B | A | B | A | A |
| | PHYSICAL PROPERTY EVALUATION | STORAGE STABILITY | | A | A | A | A | B | B |

(56) References Cited

U.S. PATENT DOCUMENTS

| | | | | |
|---|---|---|---|---|
| 2018/0282564 | A1* | 10/2018 | Matsuzaki | C09D 11/54 |
| 2019/0077978 | A1* | 3/2019 | Suzuki | C09D 11/322 |
| 2020/0070554 | A1* | 3/2020 | Maegawa | C09D 11/40 |
| 2022/0363928 | A1* | 11/2022 | Gnatiuk | C09D 11/10 |
| 2023/0167323 | A1* | 6/2023 | Aoki | C09D 11/102 524/431 |
| 2023/0183509 | A1* | 6/2023 | Kusada | C09D 11/033 524/501 |

* cited by examiner

FIG. 1

<TABLE 1>

| | | | | EXAMPLE 1 | EXAMPLE 2 | EXAMPLE 3 | EXAMPLE 4 | EXAMPLE 5 | EXAMPLE 6 |
|---|---|---|---|---|---|---|---|---|---|
| SOLID CONCENTRATION OF INK COMPOSITION (PERCENT BY MASS) | PIGMENT DISPERSION LIQUID | A (PERINONE-BASED PIGMENT) | PO 43 | 3.0 | 3.0 | 3.0 | – | 3.0 | 3.0 |
| | | B (AZO-BASED PIGMENT) | PR 150 | 1.0 | – | – | 3.0 | 1.0 | 1.0 |
| | | C (QUINACRIDONE-BASED PIGMENT) | PR 122 | – | 1.0 | – | 1.0 | – | – |
| | | D (AZO-BASED PIGMENT) | PR 242 | – | – | 1.0 | – | – | – |
| | SURFACTANT | POLYSILOXANE BASE | KF-640 (HLB VALUE: 14) | 0.5 | 0.5 | 0.5 | 0.5 | 0.2 | 1.5 |
| | | | FZ-2105 (HLB VALUE: 11) | – | – | – | – | – | – |
| | | | KF-6015 (HLB VALUE: 5) | – | – | – | – | – | – |
| | | ACETYLENE GLYCOL BASE | SURFYNOL 104E (HLB VALUE: 4) | – | – | – | – | – | – |
| | | | SURFYNOL SE (HLB VALUE: 6) | – | – | – | – | – | – |
| | | | SURFYNOL 440 (HLB VALUE: 8) | 0.2 | 0.2 | 0.2 | 0.2 | 0.2 | 0.2 |
| | | | SURFYNOL 465 (HLB VALUE: 13) | – | – | – | – | – | – |
| | ORGANIC SOLVENT | GLYCERIN (SP VALUE: 16.7) | | 10 | 10 | 10 | 10 | 10 | 10 |
| | | PROPYLENE GLYCOL (SP VALUE: 14.2) | | – | – | – | – | – | – |
| | | 1,2-HEXANEDIOL (SP VALUE: 12.2) | | 5 | 5 | 5 | 5 | 5 | 5 |
| | | DIETHYLENE GLYCOL MONOISOBUTYL ETHER (SP VALUE: 8.7) | | – | – | – | – | – | – |
| | pH ADJUSTER | TRIETHANOLAMINE | | 0.5 | 0.5 | 0.5 | 0.5 | 0.5 | 0.5 |
| | WATER | ION EXCHANGE WATER | | BALANCE | BALANCE | BALANCE | BALANCE | BALANCE | BALANCE |
| | TOTAL | | | 100 | 100 | 100 | 100 | 100 | 100 |
| | COMPOSITION RATIO | CONTENT A : CONTENT B | | 2.5 | 2.5 | 2.5 | 2.5 | 1 | 7.5 |
| | | CONTENT B : CONTENT C | | 0.04 | 0.04 | 0.04 | 0.04 | 0.04 | 0.04 |
| RECEIVING BODY | CONTAINER | 1 | | ○ | ○ | ○ | ○ | ○ | ○ |
| | | 2 | | | | | | | |
| | | 3 | | | | | | | |
| | | 4 | | | | | | | |
| | DISSOLVED NITROGEN | MEASUREMENT TIME AFTER FILLING (YEAR) | | 1 | 1 | 1 | 1 | 1 | 1 |
| | | DISSOLVED NITROGEN AMOUNT (ppm) | | 6 | 6 | 6 | 6 | 6 | 6 |
| EVALUATION | EJECTION EVALUATION | CONTINUOUS EJECTION PROPERTY | | A | A | A | A | B | A |
| | | CLOGGING RESISTANCE | | A | B | A | B | A | A |
| | PHYSICAL PROPERTY EVALUATION | STORAGE STABILITY | | A | A | A | A | B | B |

FIG. 2

<TABLE 2>

| | | | | EXAMPLE 7 | EXAMPLE 8 | EXAMPLE 9 | EXAMPLE 10 | EXAMPLE 11 | EXAMPLE 12 |
|---|---|---|---|---|---|---|---|---|---|
| SOLID CONCENTRATION OF INK COMPOSITION (PERCENT BY MASS) | PIGMENT DISPERSION LIQUID | A (PERINONE-BASED PIGMENT) | PO 43 | 3.0 | 3.0 | 3.0 | 3.0 | 3.0 | 3.0 |
| | | B (AZO-BASED PIGMENT) | PR 150 | 1.0 | 1.0 | 1.0 | 1.0 | 1.0 | 1.0 |
| | | C (QUINACRIDONE-BASED PIGMENT) | PR 122 | – | – | – | – | – | – |
| | | D (AZO-BASED PIGMENT) | PR 242 | – | – | – | – | – | – |
| | SURFACTANT | POLYSILOXANE BASE | KF-640 (HLB VALUE: 14) | – | 0.5 | 0.5 | 0.5 | 0.5 | 0.5 |
| | | | FZ-2105 (HLB VALUE: 11) | 0.5 | – | – | – | – | – |
| | | | KF-6015 (HLB VALUE: 5) | – | – | – | – | – | – |
| | | ACETYLENE GLYCOL BASE | SURFYNOL 104E (HLB VALUE: 4) | – | – | – | – | – | – |
| | | | SURFYNOL SE (HLB VALUE: 6) | – | – | – | 0.2 | – | – |
| | | | SURFYNOL 440 (HLB VALUE: 8) | 0.2 | 0.1 | 1.0 | – | 0.2 | 0.2 |
| | | | SURFYNOL 465 (HLB VALUE: 13) | – | – | – | – | – | – |
| | ORGANIC SOLVENT | GLYCERIN (SP VALUE: 16.7) | | 10 | 10 | 10 | 10 | 10 | 10 |
| | | PROPYLENE GLYCOL (SP VALUE: 14.2) | | – | – | – | – | – | – |
| | | 1,2-HEXANEDIOL (SP VALUE: 12.2) | | 5 | 5 | 5 | 5 | 1 | 10 |
| | | DIETHYLENE GLYCOL MONOISOBUTYL ETHER (SP VALUE: 8.7) | | – | – | – | – | – | – |
| | pH ADJUSTER | TRIETHANOLAMINE | | 0.5 | 0.5 | 0.5 | 0.5 | 0.5 | 0.5 |
| | WATER | ION EXCHANGE WATER | | BALANCE | BALANCE | BALANCE | BALANCE | BALANCE | BALANCE |
| | TOTAL | | | 100 | 100 | 100 | 100 | 100 | 100 |
| | COMPOSITION RATIO | CONTENT A : CONTENT B | | 2.5 | 5 | 0.5 | 2.5 | 2.5 | 2.5 |
| | | CONTENT B : CONTENT C | | 0.04 | 0.02 | 0.2 | 0.04 | 0.2 | 0.02 |
| RECEIVING BODY | CONTAINER | 1 | | ○ | ○ | ○ | ○ | ○ | ○ |
| | | 2 | | | | | | | |
| | | 3 | | | | | | | |
| | | 4 | | | | | | | |
| | DISSOLVED NITROGEN | MEASUREMENT TIME AFTER FILLING (YEAR) | | 1 | 1 | 1 | 1 | 1 | 1 |
| | | DISSOLVED NITROGEN AMOUNT (ppm) | | 6 | 6 | 6 | 6 | 6 | 6 |
| EVALUATION | EJECTION EVALUATION | CONTINUOUS EJECTION PROPERTY | | B | B | A | B | A | A |
| | | CLOGGING RESISTANCE | | A | A | B | A | B | A |
| | PHYSICAL PROPERTY EVALUATION | STORAGE STABILITY | | B | A | B | A | A | B |

FIG. 3

<TABLE 3>

| | | | | EXAMPLE 13 | EXAMPLE 14 | EXAMPLE 15 | EXAMPLE 16 | EXAMPLE 17 |
|---|---|---|---|---|---|---|---|---|
| SOLID CONCENTRATION OF INK COMPOSITION (PERCENT BY MASS) | PIGMENT DISPERSION LIQUID | A (PERINONE-BASED PIGMENT) | PO 43 | 3.0 | 3.0 | 3.0 | 3.0 | 3.0 |
| | | B (AZO-BASED PIGMENT) | PR 150 | 1.0 | 1.0 | 1.0 | 1.0 | 1.0 |
| | | C (QUINACRIDONE-BASED PIGMENT) | PR 122 | – | – | – | – | – |
| | | D (AZO-BASED PIGMENT) | PR 242 | – | – | – | – | – |
| | SURFACTANT | POLYSILOXANE BASE | KF-640 (HLB VALUE: 14) | 0.5 | 0.5 | 0.5 | 0.5 | 0.5 |
| | | | FZ-2105 (HLB VALUE: 11) | – | – | – | – | – |
| | | | KF-6015 (HLB VALUE: 5) | – | – | – | – | – |
| | | ACETYLENE GLYCOL BASE | SURFYNOL 104E (HLB VALUE: 4) | – | – | – | – | – |
| | | | SURFYNOL SE (HLB VALUE: 6) | – | – | – | – | – |
| | | | SURFYNOL 440 (HLB VALUE: 8) | 0.2 | 0.2 | 0.2 | 0.2 | 0.2 |
| | | | SURFYNOL 465 (HLB VALUE: 13) | – | – | – | – | – |
| | ORGANIC SOLVENT | GLYCERIN (SP VALUE: 16.7) | | 10 | 10 | 10 | 10 | 10 |
| | | PROPYLENE GLYCOL (SP VALUE: 14.2) | | 3 | – | – | – | – |
| | | 1,2-HEXANEDIOL (SP VALUE: 12.2) | | – | – | 5 | 5 | 5 |
| | | DIETHYLENE GLYCOL MONOISOBUTYL ETHER (SP VALUE: 8.7) | | – | 3 | – | – | – |
| | pH ADJUSTER | TRIETHANOLAMINE | | 0.5 | 0.5 | 0.5 | 0.5 | 0.5 |
| | WATER | ION EXCHANGE WATER | | BALANCE | BALANCE | BALANCE | BALANCE | BALANCE |
| | TOTAL | | | 100 | 100 | 100 | 100 | 100 |
| | COMPOSITION RATIO | CONTENT A : CONTENT B | | 2.5 | 2.5 | 2.5 | 2.5 | 2.5 |
| | | CONTENT B : CONTENT C | | – | – | 0.04 | 0.04 | 0.04 |
| RECEIVING BODY | CONTAINER | 1 | | ○ | ○ | | | ○ |
| | | 2 | | | | | | |
| | | 3 | | | | ○ | | |
| | | 4 | | | | | ○ | |
| | DISSOLVED NITROGEN | MEASUREMENT TIME AFTER FILLING (YEAR) | | 1 | 1 | 1 | 1 | 0.5 |
| | | DISSOLVED NITROGEN AMOUNT (ppm) | | 6 | 6 | 10 | 15 | 5 |
| EVALUATION | EJECTION EVALUATION | CONTINUOUS EJECTION PROPERTY | | A | A | B | B | A |
| | | CLOGGING RESISTANCE | | B | A | A | B | A |
| | PHYSICAL PROPERTY EVALUATION | STORAGE STABILITY | | A | B | A | A | A |

FIG. 4

〈TABLE 4〉

| | | | | COMPARATIVE EXAMPLE 1 | 2 | 3 | 4 | 5 | 6 |
|---|---|---|---|---|---|---|---|---|---|
| SOLID CONCENTRATION OF INK COMPOSITION (PERCENT BY MASS) | PIGMENT DISPERSION LIQUID | A (PERINONE-BASED PIGMENT) | PO 43 | 3.0 | 3.0 | 3.0 | 3.0 | 3.0 | 3.0 |
| | | B (AZO-BASED PIGMENT) | PR 150 | 1.0 | 1.0 | 1.0 | 1.0 | 1.0 | 1.0 |
| | | C (QUINACRIDONE-BASED PIGMENT) | PR 122 | – | – | – | – | – | – |
| | | D (AZO-BASED PIGMENT) | PR 242 | – | – | – | – | – | – |
| | SURFACTANT | POLYSILOXANE BASE | KF-640 (HLB VALUE: 14) | – | – | 0.5 | 0.5 | 0.5 | – |
| | | | FZ-2105 (HLB VALUE: 11) | – | – | – | – | – | – |
| | | | KF-6015 (HLB VALUE: 5) | – | 0.5 | – | – | – | – |
| | | ACETYLENE GLYCOL BASE | SURFYNOL 104E (HLB VALUE: 4) | – | – | 0.2 | – | – | – |
| | | | SURFYNOL SE (HLB VALUE: 6) | – | – | – | – | – | – |
| | | | SURFYNOL 440 (HLB VALUE: 8) | 0.2 | 0.2 | – | – | – | 0.2 |
| | | | SURFYNOL 465 (HLB VALUE: 13) | – | – | – | – | 0.2 | 0.5 |
| | ORGANIC SOLVENT | GLYCERIN (SP VALUE: 16.7) | | 10 | 10 | 10 | 10 | 10 | 10 |
| | | PROPYLENE GLYCOL (SP VALUE: 14.2) | | – | – | – | – | – | – |
| | | 1,2-HEXANEDIOL (SP VALUE: 12.2) | | 5 | 5 | 5 | 5 | 5 | 5 |
| | | DIETHYLENE GLYCOL MONOISOBUTYL ETHER (SP VALUE: 8.7) | | – | – | – | – | – | – |
| | pH ADJUSTER | TRIETHANOLAMINE | | 0.5 | 0.5 | 0.5 | 0.5 | 0.5 | 0.5 |
| | WATER | ION EXCHANGE WATER | | BALANCE | BALANCE | BALANCE | BALANCE | BALANCE | BALANCE |
| | TOTAL | | | 100 | 100 | 100 | 100 | 100 | 100 |
| | COMPOSITION RATIO | CONTENT A : CONTENT B | | 0 | 2.5 | 2.5 | – | 2.5 | 0 |
| | | CONTENT B : CONTENT C | | 0.04 | 0.04 | 0.04 | 0 | 0.04 | 0.14 |
| RECEIVING BODY | CONTAINER | 1 | | ○ | ○ | ○ | ○ | ○ | ○ |
| | | 2 | | | | | | | |
| | | 3 | | | | | | | |
| | | 4 | | | | | | | |
| | DISSOLVED NITROGEN | MEASUREMENT TIME AFTER FILLING (YEAR) | | 1 | 1 | 1 | 1 | 1 | 1 |
| | | DISSOLVED NITROGEN AMOUNT (ppm) | | 6 | 6 | 6 | 6 | 6 | 6 |
| EVALUATION | EJECTION EVALUATION | CONTINUOUS EJECTION PROPERTY | | C | C | C | C | C | C |
| | | CLOGGING RESISTANCE | | C | C | C | C | C | C |
| | PHYSICAL PROPERTY EVALUATION | STORAGE STABILITY | | C | C | B | A | A | B |

FIG. 5

<TABLE 5>

| | | | | REFERENCE EXAMPLE 1 | 2 | 3 | 4 | 5 |
|---|---|---|---|---|---|---|---|---|
| SOLID CONCENTRATION OF INK COMPOSITION (PERCENT BY MASS) | PIGMENT DISPERSION LIQUID | A (PERINONE-BASED PIGMENT) | PO 43 | 3.0 | 3.0 | 3.0 | 3.0 | – |
| | | B (AZO-BASED PIGMENT) | PR 150 | 1.0 | 1.0 | 1.0 | – | – |
| | | C (QUINACRIDONE-BASED PIGMENT) | PR 122 | – | – | – | – | – |
| | | D (AZO-BASED PIGMENT) | PR 242 | – | – | – | – | 3.0 |
| | SURFACTANT | POLYSILOXANE BASE | KF-640 (HLB VALUE: 14) | 0.5 | 0.5 | – | 0.5 | – |
| | | | FZ-2105 (HLB VALUE: 11) | – | – | – | – | – |
| | | | KF-6015 (HLB VALUE: 5) | – | – | – | – | – |
| | | ACETYLENE GLYCOL BASE | SURFYNOL 104E (HLB VALUE: 4) | – | – | – | – | – |
| | | | SURFYNOL SE (HLB VALUE: 6) | – | – | – | – | – |
| | | | SURFYNOL 440 (HLB VALUE: 8) | 0.2 | – | 0.2 | – | 0.2 |
| | | | SURFYNOL 465 (HLB VALUE: 13) | – | – | – | – | – |
| | ORGANIC SOLVENT | GLYCERIN (SP VALUE: 16.7) | | 10 | 10 | 10 | 10 | 10 |
| | | PROPYLENE GLYCOL (SP VALUE: 14.2) | | – | – | – | – | – |
| | | 1,2-HEXANEDIOL (SP VALUE: 12.2) | | 5 | 5 | 5 | 5 | 5 |
| | | DIETHYLENE GLYCOL MONOISOBUTYL ETHER (SP VALUE: 8.7) | | – | – | – | – | – |
| | pH ADJUSTER | TRIETHANOLAMINE | | 0.5 | 0.5 | 0.5 | 0.5 | 0.5 |
| | WATER | ION EXCHANGE WATER | | BALANCE | BALANCE | BALANCE | BALANCE | BALANCE |
| | TOTAL | | | 100 | 100 | 100 | 100 | 100 |
| | COMPOSITION RATIO | CONTENT A : CONTENT B | | 2.5 | – | 0 | – | 0 |
| | | CONTENT B : CONTENT C | | 0.04 | 0 | 0.04 | 0 | 0.04 |
| RECEIVING BODY | CONTAINER | 1 | | | | | ○ | ○ |
| | | 2 | | ○ | ○ | ○ | | |
| | | 3 | | | | | | |
| | | 4 | | | | | | |
| | DISSOLVED NITROGEN | MEASUREMENT TIME AFTER FILLING (YEAR) | | 1 | 1 | 1 | 1 | 1 |
| | | DISSOLVED NITROGEN AMOUNT (ppm) | | 4 | 4 | 4 | 6 | 6 |
| EVALUATION | EJECTION EVALUATION | CONTINUOUS EJECTION PROPERTY | | A | B | B | A | C |
| | | CLOGGING RESISTANCE | | A | A | A | A | C |
| | PHYSICAL PROPERTY EVALUATION | STORAGE STABILITY | | A | A | C | A | C |

INK-RECEIVING BODY AND RECORDING METHOD

The present application is based on, and claims priority from JP Application Serial Number 2023-182925, filed Oct. 25, 2023, the disclosure of which is hereby incorporated by reference herein in its entirety.

BACKGROUND

1. Technical Field

The present disclosure relates to an ink-receiving body and a recording method.

2. Related Art

Since being able to record a highly fine image using a relatively simple apparatus, an ink jet recording method has been rapidly developed in various types of fields. Among the developments, various types of studies on improvement in color reproducibility using an aqueous ink have been carried out. For example, in JP-A-2007-297596, in order to obtain a desired hue, an ink set using an ink composition in which at least two types of pigments are mixed together has been disclosed.

However, as is the case of the ink composition described in JP-A-2007-297596, when recording is performed using an ink composition which contains at least two types of pigments having chemical structures classified into respective different groups, depending on type of container of an ink-receiving body and handling of an ink-receiving body in which an ink composition is received, a problem in that an ejection stability is inferior may arise.

SUMMARY

According to an aspect of the present disclosure, there is provided an ink-receiving body comprising an ink jet ink composition and a container to receive the ink jet ink composition. In the ink-receiving body described above, the ink jet ink composition is an aqueous ink containing a pigment and a surfactant, the pigment includes at least two types of pigments having chemical structures classified into respective different groups, the surfactant includes a polysiloxane-based surfactant having an HLB value of 10 or more and an acetylene glycol-based surfactant having an HLB value of 6 to 10, and the received ink jet ink composition contains a dissolved nitrogen amount of 5 ppm or more.

According to another aspect of the present disclosure, there is provided an ink jet recording method comprising an adhesion step of ejecting from an ink jet head, an ink jet ink composition supplied from the ink-receiving body described above so as to be adhered to a recording medium.

BRIEF DESCRIPTION OF THE DRAWINGS

FIG. 1 is TABLE 1 showing conditions and evaluation results of Examples.

FIG. 2 is TABLE 2 showing conditions and evaluation results of Examples.

FIG. 3 is TABLE 3 showing conditions and evaluation results of Examples.

FIG. 4 is TABLE 4 showing conditions and evaluation results of Comparative Examples.

FIG. 5 is TABLE 5 showing conditions and evaluation results of Reference Examples.

DESCRIPTION OF EMBODIMENTS

Figure 6:
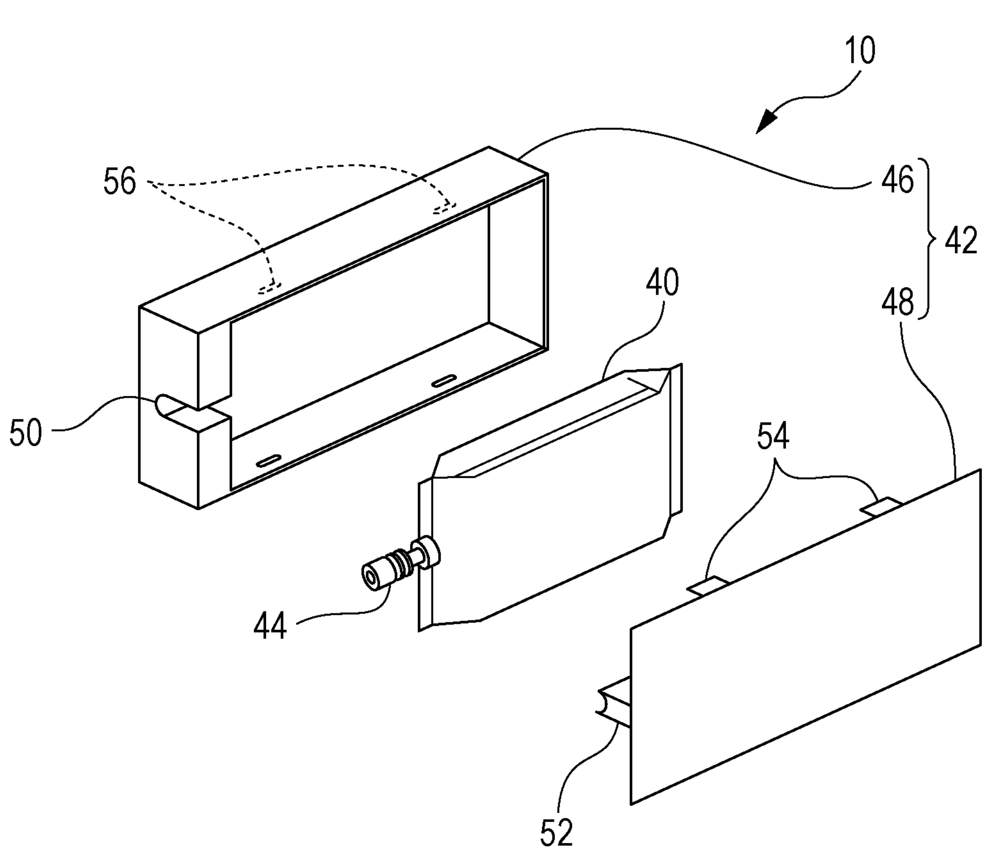
FIG. 6 is a view showing an ink pack as one example of a container of this embodiment.

Hereinafter, if needed, with reference to the drawings, embodiments (hereinafter, each referred to as "this embodiment") of the present disclosure will be described in detail; however, the present disclosure is not limited thereto and may be variously changed and/or modified without departing from the scope of the present disclosure. In addition, in the drawings, the same elements will be designated by the same reference numerals, and duplicated description will be omitted. In addition, unless otherwise particularly noted, the positional relationship between top and bottom and/or left and right is based on the positional relationship shown in the drawing. Furthermore, the dimensional ratios in the drawings are not limited to those shown therein.

1. INK-RECEIVING BODY

An ink-receiving body according to this embodiment is an ink-receiving body including an ink jet ink composition (hereinafter, simply referred to as "ink composition" in some cases) and a container receiving the ink jet ink composition described above, the ink jet ink composition is an aqueous ink containing a pigment and a surfactant, the pigment includes at least two types of pigments having chemical structures classified into respective different groups, the surfactant includes a polysiloxane-based surfactant having an HLB value of 10 or more and an acetylene glycol-based surfactant having an HLB value of 6 to 10, and the received ink jet ink composition contains a dissolved nitrogen amount of 5 ppm or more.

When a pigment is used for preparation of a pigment dispersion liquid or an ink composition, fine air bubbles may remain on surfaces of pigment particles in some cases. After growing, the fine air bubbles as described above are released from the pigment and then emitted into the ink composition, and air bubbles are generated in the ink composition; hence, an ejection defect is generated by the air bubbles. In addition, the growth of the fine air bubble is promoted by a gas component, such as nitrogen, dissolved in the ink. Hence, in accordance with hydrophilicity, hydrophobicity, unevenness, and smoothness of a pigment to be used, types and amounts of a surfactant and an organic solvent are adjusted so as to enhance wettability of the pigment surface and so as not to allow fine air bubbles to remain.

However, in order to obtain a desired color from one aqueous ink, at least two types of pigments may be used in some cases. Pigments having chemical structures classified into respective different groups may have, because of the chemical structures thereof, different hydrophilicities and hydrophobicities and may also have different unevennesses and smoothnesses. Accordingly, an ink composition to enhance the wettability of the pigment surface and not to allow the fine air bubbles to remain is difficult to uniquely determine. Hence, an aqueous ink containing at least two types of pigments which have chemical structures classified into respective different groups is difficult to improve in terms of ejection stability.

On the other hand, to inhibit the growth of fine air bubbles may also be considered in a manner such that by the use of a container having a high gas barrier property, a concentration of a gas component dissolved in the ink is not allowed to increase. However, even if the container as described above is used, depending on handling of the ink composition, the dissolution of air is difficult to inhibit.

Accordingly, in this embodiment, since a polysiloxane-based surfactant having a high HLB value and an acetylene glycol-based surfactant having a low HLB value are contained, the wettability of the pigment surface is improved, the fine air bubbles are not allowed to adsorb on the pigment surface, and the ejection stability is prevented from being degraded by the growth of the fine air bubbles; hence, even in the case in which the dissolved nitrogen amount in the ink composition is 5 ppm or more, an ink composition excellent in ejection stability can be provided. However, the factors are not limited to those described above. Hereinafter, components forming the ink-receiving body will be described in detail.

1.1. Ink Jet Ink Composition

An ink jet ink composition according to this embodiment is an aqueous ink containing a pigment and a surfactant, the pigment includes at least two types of pigments having chemical structures classified into respective different groups, and the surfactant includes a polysiloxane-based surfactant having an HLB value of 10 or more and an acetylene glycol-based surfactant having an HLB value of 6 to 10. Since the ink composition has the composition described above, the ink-receiving body can be made excellent in ejection stability.

1.1.1. Pigment

The ink composition of this embodiment contains at least two types of pigments having chemical structures classified into respective different groups. Incidentally, in this specification, the "chemical structures classified into respective different groups" indicates the case in which when compounds are classified based on their common chemical structures, such as functional groups, by a person skilled in the art, as a result, the compounds are to be separately classified into the respective groups which have different chemical structures from each other. In particular, pigments which are classified, for example, into an azo-based compound, a quinacridone-based compound, a dioxazine-based compound, a perinone-based compound, a perylene-based compound, a diketopyrrolopyrrole-based compound, an isoindolinone-based compound, and a threne-based compound are the pigments having chemical structures classified into respective different groups. As is the case of combination between an azo-based compound and a quinacridone-based compound, the ink composition of this embodiment contains at least two types of compounds selected from the group consisting of the pigments which belong to the groups described above. On the other hand, when two types of azo-based compounds having different structures are contained as the pigment, "to contain at least two types of pigments having chemical structures classified into respective different groups" in this embodiment is not satisfied. Since those pigments are contained, in particular, the ejection defect caused by air bubbles is liable to occur, and hence, the effect of the present disclosure tends to become significant. In addition, as the pigment, only two types of compounds may be used, and at least three types of compounds may also be used.

In this embodiment, a first pigment compound which is an azo-based compound and at least one type of second pigment compound selected from the group consisting of a quinacridone-based compound, a dioxazine-based compound, a perinone-based compound, a perylene-based compound, and a diketopyrrolopyrrole-based compound are preferably contained.

The case described above is preferable since a range of recordable hue angle is wide. On the other hand, in the first pigment compound, flatness of the pigment particle tends to be high, and in the second pigment compound, flatness of the pigment particle tends to be low. Accordingly, when the compounds as described above are contained as the pigment, since the two types of pigments are made more different from each other, in particular, the ejection defect is liable to occur by air bubbles, and hence, the effect of the present disclosure tends to become significant. In addition, a storage stability also tends to be further improved.

From a point similar to that described above, as the second pigment compound, at least one selected from the group consisting of a perinone-based compound and a quinacridone-based compound is more preferably contained.

When the first pigment compound which is an azo-based compound is contained, a color development property is preferably made excellent.

As the second pigment compound, when a perinone-based compound is contained, the ejection stability is preferably made more excellent. Even when a quinacridone-based compound is contained as the second pigment compound, according to this embodiment, for example, the ejection stability and the storage stability are usefully obtained.

In this embodiment, the ink composition preferably has a yellow-reddish hue. For the yellow-reddish hue, for example, a yellow ink, an orange ink, a magenta ink, and a red ink may be used, and those are inks to be primarily used for warm color recording.

For example, when recorded matters in each of which a single ink is alone adhered to a recording medium are measured by CIE L*a*b* color system, between a hue angle of a recorded matter formed by a yellow ink and a hue angle of a recorded matter formed by a magenta ink (including) 0°, the hue angle of a recorded matter formed by the ink composition of this embodiment is located. As the recorded matter to be measured, a recorded matter in which a surface of a portion of a white recording medium to be measured is all covered with the ink is used. The ink composition of this embodiment may also be called an ink located in a range of from a yellow ink to a magenta ink in terms of hue angle.

The warm color is required to be recorded with various types of colors, and it may be difficult in some cases to prepare a desired color only by one type of pigment. Accordingly, a plurality of pigments is used in many cases. In addition, in combination of pigments to form a yellow-reddish ink as described above, in particular, the ejection defect is liable to occur due to air bubbles, and hence, the effect of the present disclosure tends to become significant. In addition, the storage stability also tends to be further improved.

Among the yellow-reddish inks, in particular, an ink other than a yellow ink is more preferable. For example, yellow-reddish inks, such as an orange ink, a magenta ink, and a red ink, may be mentioned. Those inks mentioned above are also called, in particular, reddish inks in some cases.

In addition, the ink composition described above is also preferably used for a special color ink among the yellow-reddish inks. A yellow-reddish special color ink is an ink other than a yellow ink and a magenta ink each of which is a basic color ink among the yellow-reddish inks. On the other hand, the ink composition described above is also preferably used for the basic color ink among the yellow-reddish inks. The basic color inks among the yellow-reddish inks are a yellow ink and a magenta ink.

In the case of those inks, the effect of the present disclosure is preferably made more significant.

A content of the first pigment compound which is an azo-based compound with respect to a total mass of the ink composition is preferably 0.1 to 5.0 percent by mass, more preferably 0.5 to 4.0 percent by mass, further preferably 0.7 to 3.0 percent by mass, and particularly preferably 1.0 to 2.0 percent by mass.

Since the content of the first pigment compound is set in the range described above, the ejection stability and the storage stability tend to be more reliably improved.

A content of the second pigment compound with respect to the total mass of the ink composition is preferably 0.5 to 5.0 percent by mass, more preferably 1.0 to 4.0 percent by mass, and further preferably 2.0 to 3.5 percent by mass.

Since the content of the second pigment compound is set in the range described above, the ejection stability and the storage stability tend to be more reliably improved.

As the azo-based compound (azo-based pigment), for example, there may be mentioned C.I. Pigment Yellow 1, 3, 4, 6, 12, 14, 17, 55, 62, 65, 73, 74, 81, 83, 95, 97, 104, 117, 120, 128, 129, 150, 151, 154, 155, 167, 174, 180, 185, or 213 as a pigment used for a yellow ink; C.I. Pigment Red 1, 2, 3, 4, 5, 7, 9, 12, 17, 23, 48 (Mn), 48 (Ca), 48:1, 48:2, 57 (Ca), 57:1, 112, 114, 144, 146, 150, 166, 175, 176, 184, 192, 206, 207, 282, or 242 as a pigment used for a magenta ink; or C.I. Pigment Orange 1, 5, 13, 16, 34, 36, 60, 61, 62, 64, 67, or 72 as a pigment used for an orange ink. In order to more effectively and reliably obtain the effect of the present disclosure, the PR150 and/or PR242 described above are preferably used.

In addition, although the pigments mentioned above are preferably used for the yellow-reddish inks, inks in which the pigments mentioned above are to be contained are not limited to the inks described above, and the above pigments are mentioned by way of example. The following pigments are also similar to those described above.

A content of the azo-based compound with respect to the total mass of the ink composition is preferably 0.1 to 5.0 percent by mass, more preferably 0.5 to 4.0 percent by mass, and further preferably 1.0 to 3.0 percent by mass. Since the content of the azo-based compound is set in the range described above, the ejection stability and the storage stability tend to be more reliably improved.

As the quinacridone-based compound (quinacridone-based pigment), for example, C.I. Pigment Red 122, 202, 206, 207, or 209, C.I. Pigment Violet 19, C.I. Pigment Orange 48 or 49 may be mentioned. In order to more effectively and reliably obtain the effect of the present disclosure, the above PR122 is preferably used.

A content of the quinacridone-based compound with respect to the total mass of the ink composition is preferably 0.1 to 5.0 percent by mass and more preferably 0.5 to 3.0 percent by mass. Since the content of the quinacridone-based compound is set in the range described above, the ejection stability and the storage stability tend to be more reliably improved.

As the perinone-based compound (perinone-based pigment), for example, Perinone Orange 43 may be mentioned. In order to more effectively and reliably obtain the effect of the present disclosure, the above PO43 is preferably used.

A content of the perinone-based compound with respect to the total mass of the ink composition is preferably 1.0 to 5.0 percent by mass and more preferably 2.0 to 4.0 percent by mass. Since the content of the perinone-based compound is set in the range described above, the ejection stability tends to be more reliably improved.

As the dioxazine-based compound (dioxazine-based pigment), for example, C.I. Pigment Blue 80 or C.I. Pigment Violet 23 or 37 may be mentioned.

As the perylene-based compound (perylene-based pigment), for example, C.I. Pigment Red 123, 149, or 178 may be mentioned.

As the diketopyrrolopyrrole-based compound (diketopyrrolopyrrole-based pigment), for example, C.I. Pigment Red 254, 255, 164, 270, 272, or 283 may be mentioned.

A total content of the pigment in the ink composition with respect to the total mass thereof is preferably 0.5 to 10 percent by mass, more preferably 1.0 to 8.0 percent by mass, and further preferably 3.0 to 5.0 percent by mass. Since the total content of the pigment is set in the range described above, the ejection stability and the storage stability tend to be more reliably improved.

The pigment is preferably to be stably dispersed in a dispersion medium, and hence, the pigment may be dispersed using a dispersant. As the dispersant, for example, a surfactant or a dispersant resin formed of a resin may be mentioned. The dispersant may be selected from materials capable of imparting a preferable dispersion stability to the pigment in the ink composition. As the dispersant resin, for example, there may be mentioned an acrylic-based resin, an urethane-based resin, or a maleic acid-based resin. As the acrylic-based resin, a resin polymerized using at least an acrylic-based monomer may be used, and a copolymer between an acrylic-based monomer and another monomer may also be used.

A pigment dispersed using a resin is also called a resin dispersion pigment. The resin dispersion pigment may be a pigment dispersed using a resin. As the dispersant resin, for example, a water-soluble resin or a water-insoluble resin may be used. In addition, when a pigment surface is oxidized, for example, by ozone, hypochlorous acid, or fuming sulfuric acid, or a pigment particle surface is modified, for example, by introducing a hydrophilic functional group, the pigment may be used as a self-dispersible pigment. As the hydrophilic functional group to be introduced, for example, a carboxy group, a sulfo group, or a phosphorus-containing group may be mentioned.

1.1.2. Surfactant

The ink composition contains at least a polysiloxane-based surfactant having an HLB value of 10 or more (hereinafter, simply referred to as "polysiloxane-based surfactant" in some cases) and an acetylene glycol-based surfactant having an HLB value of 6 to 10 (hereinafter, simply referred to as "acetylene glycol-based surfactant" in some cases). Since the surfactants as described above are contained in the ink composition, the ink-receiving body can be made excellent in ejection stability. In addition, as the surfactant, either the above 2 types of surfactants may only be used, or at least three types of surfactants may also be used.

In this specification, the HLB (Hydrophile-Lipophile Balance) value of surfactant proposed by Davies et al. is a value to evaluate the hydrophilicity of compound and, for example, is a value obtained by the Davies method described in the literature titled "Interface Phenomena" 2nded. Academic Press, New York 1963, authored by J. T. Davies and E. K. Rideal. The HLB value described above is a value calculated by the following equation (i).

$$HLB\text{ value} = 7 + \Sigma[1] + \Sigma[2] \quad (i)$$

In the equation (i), [1] represents the number of hydrophilic groups, and [2] represents the number of hydrophobic groups.

As a commercial product of the polysiloxane-based compound, for example, there may be mentioned BYK-306, BYK-307, BYK-333, BYK-341, BYK-345, BYK-346, or BYK-348 (trade name, manufactured by BYK Japan KK); KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.); or FZ-2104Fluid, FZ-2105, FZ-2110, FZ-2123, FZ-2164, FZ-2191, FZ-5609Fluid, L-7001, L-7002, L-7604, OFX-0309Fluid, OFX-5211Fluid, SF8410Fluid, OFX-0193Fluid, SH-3746Fluid, SH-3771Fluid, SH-8400Fluid, SH-8700Fluid, or Y-7006 (trade name, manufactured by Dow Corning Toray Co., Ltd.).

However, among the products mentioned above, a product having an HLB value of 10 or more is used. The HLB value may be obtained by the above Davies Method.

In order to more effectively and reliably obtain the effect of the present disclosure, at least one selected from the group consisting of KF-640 and FZ-2105 described above is preferably used.

A content A of the polysiloxane-based surfactant with respect to the total mass of the ink composition is preferably 0.1 to 5.0 percent by mass, more preferably 0.2 to 2.0 percent by mass, and further preferably 0.3 to 1.5 percent by mass. Since the content of the polysiloxane-based surfactant is set in the range described above, the ejection stability tends to be more reliably improved.

As the acetylene glycol-based surfactant, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products & Chemicals Inc.); Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (trade name, manufactured by Nissin Chemical Industry Co., Ltd.); or Acetylenol E00, E00P, E40, or E100 (trade name, manufactured by Kawaken Fine Chemicals Co., Ltd.).

However, among those mentioned above, a product having an HLB value of 6 to 10 is used. The HLB value may be obtained by the above Davies Method.

In order to more effectively and reliably obtain the effect of the present disclosure, at least one selected from the group consisting of Surfynol 440 and Surfynol SE described above is preferably used.

A content B of the acetylene glycol-based surfactant with respect to the total mass of the ink composition is preferably 0.05 to 3.0 percent by mass and more preferably 0.1 to 1.0 percent by mass. Since the content of the acetylene glycol-based surfactant is set in the range described above, the ejection stability tends to be more reliably improved.

A mass ratio (A/B) of the content A of the polysiloxane-based surfactant to the content B of the acetylene glycol-based surfactant is 0.3 to 8.0, preferably 0.5 to 7.5, more preferably 1.2 to 4.0, further preferably 1.5 to 3.0, and particularly preferably 2.0 to 2.8. Since the A/B is set in the range described above, the ejection stability and the storage stability tend to be more reliably improved.

In addition, the ink composition of this embodiment may also contain another surfactant, such as a fluorine-based surfactant, other than the polysiloxane-based surfactant and the acetylene glycol-based surfactant. As the fluorine-based surfactant as described above, for example, there may be mentioned BYK-3440 (manufactured by BYK Japan KK), Surflon S-241, S-242, or S-243 (trade name, manufactured by AGC Seimi Chemical Co., Ltd.), or Ftergent 215M (manufactured by Neos Co., Ltd.). In addition, a polysiloxane-based surfactant and/or an acetylene glycol-based surfactant each having an HLB value outside of the range described above may also be contained.

A total content of the surfactant with respect to the total mass of the ink composition is preferably 0.1 to 5.0 percent by mass, more preferably 0.3 to 3.0 percent by mass, and further preferably 0.4 to 2.0 percent by mass. Since the total content of the surfactant is set in the range described above, the ejection stability tends to be more reliably improved.

1.1.3. Organic Solvent

The ink composition of this embodiment may also contain an organic solvent. Since the organic solvent is contained, while the ejection stability of the ink composition is maintained, moisture evaporation of a recording head tends to be suppressed when the head is left for a long time. In addition, the organic solvent may be used alone, or at least two types thereof may be used in combination.

In particular, the ink composition preferably contains an organic solvent having an SP value of 9 to 13.5 $(cal/cm^3)^{1/2}$. Since the SP value of an organic solvent to be used is set in the range described above, the ejection stability and the storage stability tend to be more reliably improved. In addition, the ink composition of this embodiment may also contain an organic solvent having an SP value out of the range of 9 to 13.5 $(cal/cm^3)^{1/2}$.

As the SP value in this specification, the Hansen solubility parameter is used. The Hansen solubility parameter is obtained such that the solubility parameter introduced by Hildebrand is divided into three components, that is, a dispersion term $\delta_d$, a polar term $\delta_p$, and a hydrogen bond term $\delta_h$, and is displayed in a three-dimensional space, and in the present disclosure, the SP value is represented by $\delta$ $[cal/cm^3]^{0.5}$], and a value calculated using the following equation is used.

$$\delta\left[\text{cal/cm}^3\right]^{0.5}\big] = \left(\delta_d^2 + \delta_p^2 + \delta_h^2\right)^{0.5}$$

As the organic solvent, a water-soluble organic solvent is preferable, and as the solvent as described above, for example, a polyol, a glycol ether, a lactam, or an alcohol may be mentioned.

The polyol is a hydrocarbon having at least two hydroxy groups in its molecule, and for example, a polyol, such as a triol, having at least three hydroxy groups in its molecule or a glycol may be mentioned.

As the glycol ether, a glycol monoether or a glycol diether may be mentioned.

For example, there may be mentioned glycerin; a glycol, such as ethylene glycol, diethylene glycol, triethylene glycol, propylene glycol, dipropylene glycol, 1,3-propanediol, 1,2-butanediol, 1,2-pentanediol, 1,2-hexanediol, 1,3-butanediol, 1,5-pentanediol, or 1,6-hexanediol; a glycol monoether, such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, triethylene glycol monomethyl ether, triethylene glycol monobutyl ether, or diethylene glycol monoisobutyl ether; a lactam compound, such as 2-pyrrolidone, N-methyl-2-pyrollidone, N-ethyl-2-pyrrolidone, or N-(2-hydroxyethyl)-2-pyrrolidone (HEP); or an alcohol, such as methanol, ethanol, n-propyl alcohol, iso-propyl alcohol, n-butanol, 2-butanol, tert-butanol, iso-butanol, n-pentanol, 2-pentanol, 3-pentanol, or tert-pentanol.

Among the organic solvents mentioned above, a polyol, such as glycerin, having at least three hydroxy groups, a glycol, or a glycol monoether is preferable. For example, at least one selected from the group consisting of glycerin (SP value: 16.7), propylene glycol (SP value: 14.2), 1,2-hexanediol (SP value: 12.2), and diethylene glycol monoisobutyl ether (SP value: 8.7) is more preferably used.

An organic solvent having an SP value of 8.5 to 17.0 $(cal/cm^3)^{1/2}$ is also preferably used.

Among organic solvents having an SP value of 8.5 to 17.0 $(cal/cm^3)^{1/2}$, an organic solvent having an SP value of 9 to 13.5 $(cal/cm^3)^{1/2}$ is also preferably used.

Since the acetylene glycol-based surfactant has a low water solubility, when the ink composition is dried at an ejection nozzle of an ink jet head, and the water is decreased, the ejection defect is liable to occur. Hence, among the organic solvents described above, when an organic solvent having an SP value of 9 to 13.5 $(cal/cm^3)^{1/2}$ is used, the water solubility of the acetylene glycol-based surfactant is more improved, and the ejection defect tends to be suppressed. Accordingly, by the use of the organic solvent described above, the ejection stability and the storage stability tend to be more reliably improved.

A content C of the organic solvent having an SP value of 9 to 13.5 $(cal/cm^3)^{1/2}$ with respect to the total mass of the ink composition is preferably 0.1 to 20 percent by mass, more preferably 0.5 to 15 percent by mass, even more preferably 1 to 15 percent by mass, further preferably 2 to 10 percent by mass, and particularly preferably 3 to 8 percent by mass.

Since the content C is set in the range described above, the ejection stability and the storage stability tend to be more reliably improved.

A mass ratio (B/C) of the content B of the acetylene glycol-based surfactant to the content C of the organic solvent described above is preferably 0.3 or less, more preferably 0.2 or less, and further preferably 0.1 or less. Since the mass ratio B/C is set in the range described above, the ejection stability and the storage stability tend to be more reliably improved. In addition, the B/C may be 0.01 or more and may also be 0.02 or more.

A total content of the organic solvent in the ink is preferably 0.1 to 25 percent by mass, more preferably 3.0 to 20.0 percent by mass, further preferably 5.0 to 18.0 percent by mass, and particularly preferably 10.0 to 15.0 percent by mass. Since the content of the organic solvent is set in the range described above, the ejection stability and the storage stability are preferably further improved.

1.1.4. Water

As water, for example, there may be mentioned pure water, such as ion exchange water, ultrafiltration water, reverse osmosis water, or distilled water; or ultrapure water in which ionic impurities are removed as much as possible. A content of the water with respect to the total mass of the ink composition is preferably 40 percent by mass or more, more preferably 45 to 98 percent by mass, even more preferably 50 to 95 percent by mass, further preferably 55 to 90 percent by mass, and particularly preferably 70 to 85 percent by mass.

The ink jet ink composition used in this embodiment is an aqueous ink. The aqueous ink is an ink containing at least water as a primary solvent component.

1.1.5. Other Components

The ink composition of this embodiment may further contain, if needed, components other than those described above. The other components are not particularly limited, and for example, a pH adjuster, an antiseptic agent, a moisturizing agent, and/or a chelating agent may be mentioned.

The pH adjuster is not particularly limited, and for example, an urea, an amine, a morpholine, a piperazine, or an amino alcohol, such as triethanolamine, may be mentioned. Among those mentioned above, triethanolamine is preferable.

1.1.6. Method for Preparing Ink Composition

A method for preparing the ink composition of this embodiment is not particularly limited and may be performed by mixing a pigment, a surfactant, and water together with, if needed, an organic solvent and other components, and hence, the ink composition of this embodiment can be prepared by mixing the components using a known method. In addition, although a mixing procedure is not particularly limited, for example, after a pigment dispersion liquid is prepared by mixing a pigment, a surfactant, and water, an ink composition may be prepared using the pigment dispersion liquid described above.

1.2. Dissolved Nitrogen Amount

In the ink-receiving body of this embodiment, the dissolved nitrogen amount in the ink composition is 5 ppm or more. Since the dissolved nitrogen amount is 5 ppm or more, the ejection defect caused by air bubbles is particularly liable to be generated, and hence, the effect of the present disclosure becomes significant. In addition, the dissolved nitrogen amount in the ink composition is preferably 5 to 20 ppm, more preferably 6 to 18 ppm, and further preferably 8 to 15 ppm. In addition, the dissolved nitrogen amount tends to be changed by a preparation method of the ink composition and a material forming a container to store the ink composition.

The dissolved nitrogen amount can be measured, for example, by a gas chromatography apparatus. The measurement is performed on a mass conversion basis. For example, a measurement apparatus which is used in the following Example may be mentioned.

1.3. Container

A container to store the ink composition according to this embodiment is not particularly limited, and for example, an ink cartridge, an ink pack, an ink bottle, an ink tank, a bottle, or a can may be mentioned. Among those mentioned above, in view of versatility, an ink cartridge, an ink pack, an ink bottle, or an ink tank is preferable. An ink pack or an ink bottle is more preferable. In addition, in order to control a gas permeability, an ink pack formed of a member having a multilayer structure or an ink bottle formed of a resin is preferable. Since an ink pack or an ink bottle is used, the effect of the present disclosure tends to be more effectively and reliably obtained. In addition, in this embodiment, the ink-receiving body is a body in which the ink is received in the container.

The member having a multilayer structure is a member having at least two layers, and for example, as described later, a member having a resin film layer as a base layer and a gas barrier layer may be mentioned.

In addition, from a point similar to that described above, the ink pack described above preferably has a resin film base layer and a gas barrier layer, and the gas barrier layer described above preferably has at least one selected from the group consisting of a gas barrier resin layer and a layer of a metal or a metal compound having a film thickness of 500 nm or less. On the other hand, in the case in which a metal foil layer (such as an aluminum foil layer) is adhered, the thickness of the aluminum layer (metal foil layer) tends to be increased, and advantages are obtained such that the gas barrier property is high, and the dissolved nitrogen amount is not likely to be increased even after long storage; however, the flexibility of the pack is not superior and is liable to be broken. In addition, the gas barrier layer may be cracked, and hence, the gas barrier property thereof tends to be deteriorated.

In particular, in the case of a large volume pack, the pack may be deformed many times by the ink weight, and hence the disadvantages described above tend to occur. On the other hand, in the case of an ink pack having the gas barrier layer described above, which is not a gas barrier layer, such as a metal foil layer, having a relatively large thickness, the flexibility is excellent, and even when the volume of the pack is increased, for example, the pack is advantageously not likely to be broken. However, the gas barrier property is relatively low, and the dissolved nitrogen amount in the received ink composition is liable to increase. Hence, the present disclosure becomes particularly useful.

The ink pack preferably has at least a resin film layer functioning as a base material to ensure a basic strength. Although the resin film layer functioning as a base material is not particularly limited, for example, a base material formed of a polyester resin (such as a PET) or a polyolefin resin (such as a polyethylene) is preferable. On the other hand, since those resin materials are inferior in terms of gas barrier property, a gas barrier layer is preferably laminated on the base material.

Although the gas barrier layer is not particularly limited, for example, a resin layer having an excellent gas barrier property or a layer of a metal or a metal compound is preferable. The layer of a metal or a metal compound is preferably a layer having a predetermined thickness or less. The layer of a metal or a metal compound is preferably, for example, a deposited layer or the like.

Although the resin layer having an excellent gas barrier property is not particularly limited, for example, a nylon, an ethylene-vinyl alcohol copolymer resin, or a poly(vinylidene chloride) may be mentioned. In addition, when the thickness is increased, the gas barrier property can also be improved. In addition, although the layer of a metal or a metal compound is not particularly limited, for example, a metal layer of aluminum or a metal compound layer of alumina, silica, ceria, titania, zirconia, or the like may be mentioned. In addition, as the deposited layer, for example, an aluminum deposited layer or a deposited layer of alumina, silica, or the like may be mentioned. The gas barrier layer as described above is thinner than metal foil and also tends to be excellent in flexibility.

The container has a volume of preferably 100 mL or more, more preferably 500 mL or more, further preferably 800 mL or more, and particularly preferably 1 L or more. An upper limit of the volume is not limited, and for example, the upper limit is preferably 10 L or less and more preferably 5 L or less. When the volume of the container is as described above or more, by the weight of the ink-receiving body, the member of the container is liable to be cracked and/or broken, and hence, the ink-receiving body of this embodiment is particularly useful.

Since a decrease in ejection stability generated in the case of a large volume ink-receiving body can be suppressed, the present disclosure is particularly useful.

Although a material for the resin film base layer of the ink pack is not particularly limited, for example, a poly(ethylene terephthalate) (PET), a nylon, or a polyethylene (PE) may be mentioned. A thickness of the resin film base layer is preferably 10 to 300 μm, more preferably 20 to 250 μm, further preferably 50 to 200 μm, and particularly preferably 70 to 150 μm.

As the gas barrier layer of the ink pack, a gas barrier resin layer formed of a resin or a layer formed of a metal or a metal compound is preferable.

In the case of the gas barrier resin layer, although the resin is not particularly limited, for example, a nylon, an ethylene-vinyl alcohol copolymer, or a poly(vinylidene chloride) may be mentioned. Those resin layers may be formed by an adhesion or a deposition method. The thickness of the gas barrier resin layer is preferably 5 to 200 μm, more preferably 10 to 150 μm, and further preferably 20 to 100 μm.

In the case of the layer of a metal or a metal compound, the thickness of the layer is preferably 10 to 500 nm, more preferably 20 to 300 nm, further preferably 30 to 200 nm, and particularly preferably 30 to 100 nm.

When the layer of a metal or a metal compound is formed, in order to have a predetermined thickness or less in consideration of the flexibility, the layer is preferably formed by a deposition method, a CVD method, a sputtering method, an ion plating method, or the like and is more preferably formed by a deposition method.

As the container of this embodiment, an ink pack will be described by way of example. FIG. 6 is an exploded perspective view showing one example of the ink pack. An ink cartridge 10 includes an ink pack 40 in which an ink is filled and a cartridge case 42 having a main body case 46 which receives the ink pack 40 therein for protection and a lid portion 48. The ink pack 40 has an ink supply port 44. The main body case 46 has a notched section 50 and groove sections 56, and the lid portion 48 has a holding section 52 and hook sections 54. In the ink cartridge 10, the ink pack 40 is received in the main body case 46 and the lid portion 54, and in this case, while being fitted to the notched section 50, the ink supply port 44 is sandwiched and fixed between the notched section 50 and the holding section 52. In addition, the main body case 46 and the lid portion 54 are air-tightly sealed since the hook sections 54 are fitted to the groove sections 56.

For example, as a film-shaped member to form the ink pack 40 which receives the ink therein, the member forming the ink pack described above may be used.

In addition, as the ink bottle, an ink bottle to refill an ink in a CISS printer or the like may be mentioned. In view of weight reduction and cost reduction, although the ink bottle is preferably a resin-made bottle, an airtight property of the lid and a gas barrier property of the container itself are low, and hence, the dissolution nitrogen amount is liable to increase.

Figure 7:
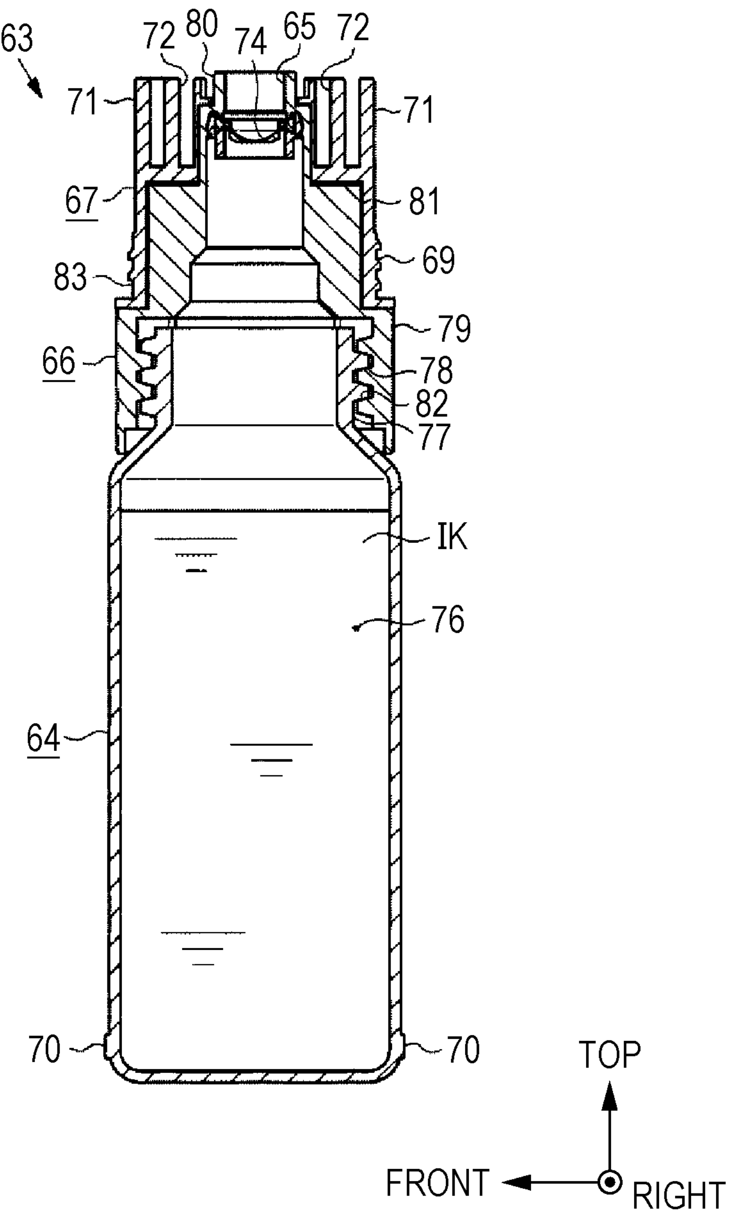
FIG. 7 is a view showing an ink bottle as one example of a container of this embodiment.

As the container of this embodiment, an ink bottle is shown by way of example. FIG. 7 is a cross-sectional view showing one example of the ink bottle. In an ink bottle 63, the ink composition described above (ink composition IK) is received. The ink bottle 63 has a cylindrical container main portion 64 as a primary portion thereof; an ink outlet forming portion 66 in which an ink outlet 65 is formed by opening a front end thereof, the ink outlet forming portion 66 being provided at a front end section of the container main portion 64 and enabling the ink in the ink bottle 63 to flow out from the ink outlet 65; and a container additional portion 67 added to the ink outlet forming portion 66 so as to enclose the ink outlet 65. Since the ink outlet 65 of the ink outlet forming portion 66 is covered together with the container additional portion 67 provided therearound by a bottom-closed tubular cap 68 (not shown), when the ink bottle 63 is stored, the ink composition is sealed from the outside.

The container main portion 64 of the ink bottle 63 is a member having a bottle shape which has an ink-receiving room 76 capable of receiving the ink composition IK therein, and in an outer circumferential surface of an upper end neck section 77 of the container main portion 64, a male screw section 78 is formed. In addition, the ink outlet forming portion 66 provided at an upper end area of the container main portion 64 has a large diameter section 79 located at an outer circumferential side of the neck section 77 of the container main portion 64, a small diameter section 80 forming the ink outlet 65 at a position farthest from the container main portion 64, and an intermediate section 81 to connect between the large diameter section 79 and the small diameter section 80.

As a member forming the bottle shape described above, for example, a member formed of a polyolefin resin, such as a polypropylene, may be preferably mentioned. Although the member as described above is preferably excellent in impact resistance, on the other hand, the gas barrier property is relatively low, and hence, the member as described above is preferably used as the ink-receiving body of this embodiment.

In addition, in the ink-receiving body of this embodiment, since the dissolved nitrogen concentration is set to 5 ppm or more, for example, a step of performing a sufficient deaeration in order to reduce the above concentration to less than 5 ppm can be omitted when the ink is prepared, and the number of manufacturing man-hours can also be reduced. In addition, since the ink container is not required to be formed using a member having a high gas barrier property, the degree of freedom of container design is increased. According, for example, a member having an excellent flexibility can be used, and as a result, for example, the container may be formed to have a larger volume, and/or the cost of the container may be reduced.

In addition, even after a predetermined time passes after the manufacturing of the ink-receiving body, the ink-receiving body may also be used by a recording apparatus. In the case described above, since the predetermined time passes after the ink-receiving body is manufactured, although the dissolved nitrogen concentration in the ink composition is increased to 5 ppm or more, the ink-receiving body is still usable. In this case, when the ink-receiving body is started to be used by a recording apparatus, the dissolved nitrogen concentration of the ink composition received in the container of the ink-receiving body may be 5 ppm or more.

In the case described above, for example, after the ink-receiving body is manufactured, even if a time necessary for storage and/or transportation passes, the ink-receiving body may be used. In the case described above, since the time can be used for storage and/or transportation, and for example, the transportation cost may be reduced, and/or the expiration period of the ink-receiving body may be increased.

2. INK JET RECORDING METHOD

An ink jet recording method of this embodiment includes an adhesion step in which the ink jet ink composition supplied from the ink-receiving body described above is ejected from an ink jet head so as to be adhered to a recording medium.

2.1. Adhesion Step

The adhesion step is a step in which an ink composition supplied from an ink-receiving body is ejected from an ink jet head and is adhered to a recording medium.

Figure 8:
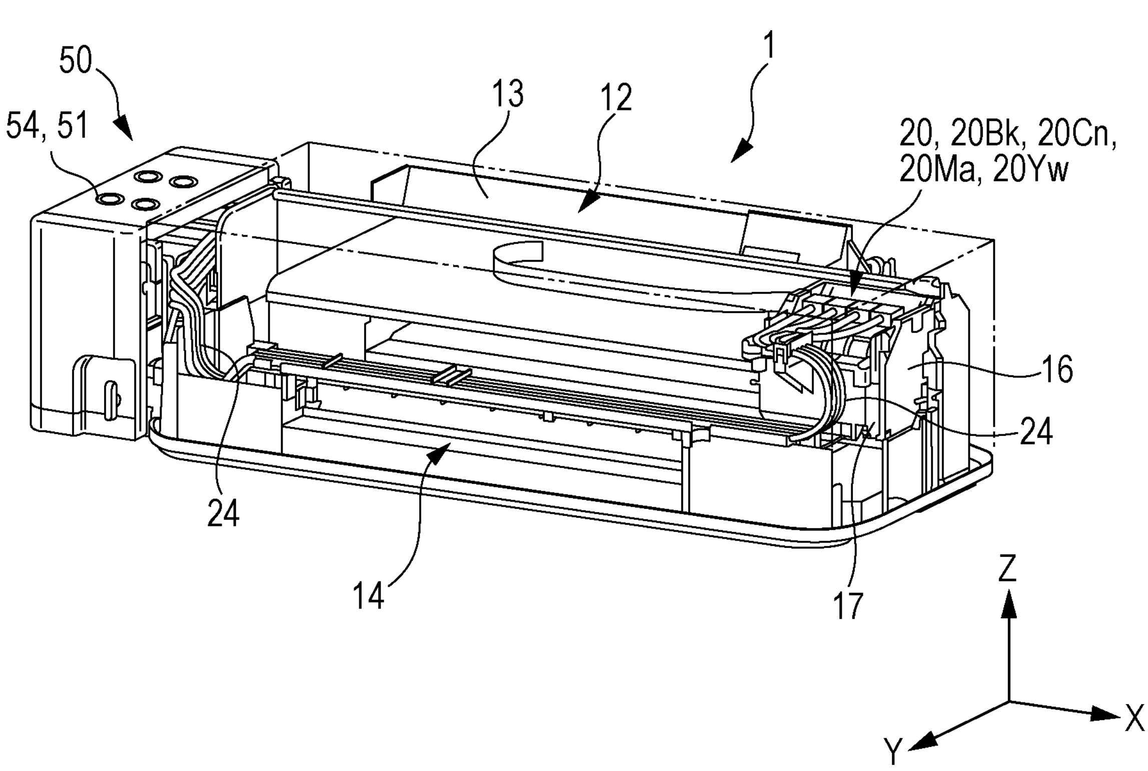
FIG. 8 is a view showing one example of a recording apparatus used for a recording method of this embodiment.

As one example of a recording apparatus used for the recording method of this embodiment, a perspective view of a printer is shown in FIG. 8. An ink jet recording apparatus 1 shown in FIG. 8 has an ink tank 50 and an ink supply tube 24 to supply an ink from the ink tank 50 to an ink jet head 17. At an ink supply path between the ink tank 50 and the ink jet head 17, a subtank 20 to relay the ink is provided. The subtank 20 to relay the ink may be provided if needed.

The ink tank 50 has an ink charge port 54 through which the ink is charged from an ink-receiving body not shown. In this embodiment, the container of the ink-receiving body is an ink bottle, and the ink in the ink bottle is charged into the ink tank 50 through the ink charge port 54.

Since the ink tank 50 is a CISS tank (continuous ink supply system tank), and the ink is configured to be charged into the ink tank 50 from the ink bottle as needed, the exchange of the ink cartridge is not required, and hence, the recording apparatus of this embodiment is a recording apparatus capable of continuously performing recording without interruption thereof.

The ink tank 50 has, for example, four ink tanks so that four types of inks can be charged therein and also has four respective ink charge ports. The number of ink supply tubes 24 and the number of ink jet heads 17 are each also four.

The ink jet head 17 records an image on a recording medium by ejecting liquid droplets of an ink composition. In addition, the recording apparatus of this embodiment has a carriage 16 which mounts the subtank 20 and the ink jet head 17 and which is reciprocally movable in an X axis direction, a paper supply port 12 to supply a recording medium, a paper discharge port 14 to discharge a recording medium, and a support portion 13 to support a recording medium to be fed to the paper supply port 12. The ink jet head 17 has a nozzle surface provided at a position facing a recording surface of a recording medium and ejects an ink in the form of liquid droplets from a plurality of nozzles provided in the nozzle surface so as to be adhered to the recording surface of the recording medium.

The ink jet recording method of this embodiment is preferably performed using a recording apparatus which has an ink bottle as the container, an ink tank having an ink charge port through which an ink jet ink composition is charged from the ink bottle, and an ink jet head to which the ink jet ink composition described above is supplied from the ink tank. In the case described above, as a result, the ink is supplied to the ink jet head from the ink bottle.

The recording apparatus used in this embodiment is not limited to that described above. For example, the recording apparatus may be configured such that the container of the ink-receiving body (not shown) is an ink pack, an ink cartridge having the ink pack is mounted in the recording apparatus, and from the ink cartridge mounted therein, an ink is supplied to the ink jet head 17 via the ink supply tube 24. In the case described above, the ink tank 50 may be not provided.

2.2. Drying Step

A drying step is a step of drying an ink composition on a recording medium, for example, by heating the recording medium. The ink jet recording method of this embodiment may include a drying step.

3. INK-RECEIVING BODY SET

In this embodiment, at least two of the ink-receiving bodies described above may also be used as a set of ink-receiving bodies (ink-receiving body set).

In the at least two ink-receiving bodies of the ink-receiving body set described above, the received ink may include a basic color ink, such as a black ink, a yellow ink, a magenta ink, or a cyan ink. Furthermore, the received ink described above may also include a special color ink other than the basic color ink.

Among those ink-receiving bodies, when the ink-receiving body of this embodiment described above includes the yellow-reddish ink described above, such as at least one selected from the group consisting of a yellow ink, a magenta ink, an orange ink, and a red ink, the range of recordable hue angle is preferably wide in a warm color system. Furthermore, the ink-receiving body of this embodiment described above more preferably includes an ink having the color as described above.

The ink jet recording method of this embodiment may also be performed using the ink-receiving body set described above.

EXAMPLES

Hereinafter, the present disclosure will be described in more detail with reference to Examples and Comparative Examples. The present disclosure is not at all limited to the following Examples.

1. Preparation of Ink Composition

FIGS. 1 to 5 are TABLEs 1 to 5 showing components of ink compositions.

In order to obtain the compositions shown in TABLES 1 to 5, after the components were charged in a mixture tank and were then mixed and stirred, filtration was performed using a membrane filter, so that the ink jet ink composition of each Example was obtained. In addition, unless otherwise particularly noted, the numerical value of the component shown in each Example in the Table is represented on a percent by mass basis. In addition, in the table, the numerical value of the pigment dispersion liquid represents a pigment solid content on a percent by mass basis.

A pigment dispersion liquid was prepared in advance in a manner such that a pigment and a dispersant resin (not shown in the table) which was a water-soluble styrene-acrylic-based resin were mixed and stirred in water at a mass ratio of 3:1, and this pigment dispersion liquid was used for ink preparation.

All the inks were yellow-reddish inks and were, in particular, yellow-reddish inks other than a yellow ink. In addition, an ink using two types of pigments was an ink having a wide range of recordable hue angle.

The pigments and the products used in TABLEs 1 to 5 are as shown below, and the HLB value of the surfactant and the SP value of the organic solvent are also shown in the tables.

Pigment Dispersion Liquid

A: perinone-based pigment (PO43, Perinone Orange 43).

B: azo-based pigment (PR150, Pigment Red 150)

C: quinacridone-based pigment (PR122, Pigment Red 122)

D: azo-based pigment (PR242, Pigment Red 242) Surfactant

KF-640 (trade name, manufactured by Shin-Etsu Chemical Co., Ltd.)

FZ-2105 (trade name, Dow Corning Toray Co., Ltd.)

KF-6015 (trade name, manufactured by Shin-Etsu Chemical Co., Ltd.)

Surfynol 104E (trade name, manufactured by Air Product and Chemicals, Inc.)

Surfynol SE (trade name, manufactured by Air Product and Chemicals, Inc.)

Surfynol 440 (trade name, manufactured by Air Product and Chemicals, Inc.)

Surfynol 465 (trade name, manufactured by Air Product and Chemicals, Inc.)

2. Reception in Container

FIGS. 1 to 5 are TABLEs 1 to 5 showing types of used receiving bodies.

A receiving body in which the ink composition was filled in one of containers 1 to 4 formed by the following formation methods was formed and was then stored at ordinary temperature until a measurement time described in the Table came. The containers 1 to 3 each used as a substrate, a low density polyethylene film having a thickness of 80 μm, each had a volume of 1 L, and each received 1 L of the ink composition.

Structure of Container

Container 1: on one surface of the substrate, an aluminum layer having a thickness of 30 nm was formed by a deposition method. Subsequently, by the use of the film thus obtained, a container (ink pack) to receive the ink composition was formed so that the aluminum layer was located at an outer package side.

Container 2: on one surface of the substrate, an aluminum layer having a thickness of 10 μm was formed by a deposition method. Subsequently, by the use of the film thus obtained, a container (ink pack) to receive the ink composition was formed so that the aluminum layer was located at an outer package side.

Container 3: on one surface of the substrate, a nylon film having a thickness of 30 μm was laminated. Subsequently, by the use of the film thus obtained, a container (ink pack) to receive the ink composition was formed so that the nylon film layer was located at an outer package side.

Container 4: a bottle-shaped receiving body (ink bottle) was formed by stretch blowing molding using a polyethylene.

After the container was stored, the dissolved nitrogen amount of the ink in the container was measured. The measurement was performed by a gas chromatography apparatus (6890N, manufactured by Agilent) on a mass conversion basis. The measurement values are shown in the tables. In addition, the dissolved nitrogen amounts of the inks immediately before the inks were filled in the containers were all 4 ppm.

For the following evaluation, the ink-receiving body after being stored was used.

3. Evaluation Method 3.1. Ejection Stability 3.1.1. Continuous Ejection Property An ink jet printer PX-H6000 (manufactured by Seiko Epson Corporation) modified machine was prepared, and the ink jet ink composition was filled therein.

In the example in which the container of the ink-receiving body was an ink pack, a recording apparatus in which an ink was supplied to an ink jet head from an ink cartridge having an ink pack via an ink supply tube was used. In the example in which the container of the ink-receiving body was an ink bottle, a recording apparatus having an ink tank which had an ink charge port was used such that an ink was charged from an ink bottle in the ink tank through the ink charge port and was then supplied to an ink jet head from the ink tank via an ink supply tube.

Printer paper "P" (A4 size) manufactured by FUJI XEROX was set, and continuous printing was performed at a resolution of 720 dpi×1, 440 dpi. Nozzle check was performed every 10 sheets, and whether or not the printing was performed normally without non-ejection and/or flight bending was confirmed. The evaluation criteria are as described below.

Evaluation Criteria

A: printing is normally performed on 100 sheets or more.

B: printing is normally performed on 10 to less than 100 sheets.

C: non-ejection or flight bending occurs at 10th sheet.

3.1.2. Clogging Resistance

The ink jet ink compositions of Examples and Comparative Examples were each filled in the recording apparatus described above, and normal ejection from all the lines was confirmed. Subsequently, while a print head was shifted from a waiting position and stopped in a printing region, the recording apparatus was left for 3 days in an environment at a temperature of 40° C. and a relative humidity of 20%. After the recording apparatus was left for 3 days, the print head was returned to the waiting position and then cleaned. The cleaning was performed on a predetermined nozzle group (number of nozzles: 600) of the ink jet head in a manner such that after 1 cc of the ink was sucked from nozzles provided in a nozzle surface, the nozzles were manually wiped using a rubber wiper.

In addition, the number of cleanings at which the ejection was recovered (no-ejection nozzles were not observed) was counted. The evaluation criteria were as described below.

Evaluation Criteria

A: all nozzles are recovered by 3 cleanings or less.

B: all nozzles are recovered by 4 to 9 cleanings.

C: Nozzles are not recovered even by 9 cleanings.

3.2. Storage Stability

After the ink composition of the ink-receiving body was discharged in a glass-made sample bottle having a volume of 50 cc and was then tightly sealed, this glass bottle was placed in a temperature-constant bath at a temperature of 50° C. and then left for 14 days in an environment at a temperature of 50° C. After being left for 14 days, the glass bottle was sufficiently returned to room temperature, and the viscosity of the ink composition was measured. The viscosity was measured using a viscoelastic test machine MCR-300 (product name) manufactured by Pysica in a manner such that after the temperature of the ink compositions was controlled at 25° C., the viscosity thereof was read at a shear rate of 200. In addition, a viscosity change rate A of the viscosity measured after 14 days to the initial viscosity was calculated. The evaluation criteria were as described below.

Evaluation Criteria

A: viscosity change rate A is less than ±5%.

B: viscosity change rate A is ±5% to less than ±10%.

C: viscosity change rate A is ±10% or more.

4. EVALUATION RESULTS OF EXAMPLES

In TABLEs 1 to 4, the components of the ink jet ink composition used in each Example, the storage method in the receiving body, and the evaluation result are shown. From TABLEs 1 to 4, it is found that the ink-receiving body of this embodiment is excellent in ejection stability (ejection evaluation), the ink-receiving body having an ink jet ink composition and a container receiving the ink jet ink composition, the ink jet ink composition being an aqueous ink containing a pigment and a surfactant, the pigment including at least two types of pigments having chemical structures classified into respective different groups, the surfactant including a polysiloxane-based surfactant having an HLB value of 10 or more and an acetylene glycol-based surfactant having an HLB value of 6 to 10, and the ink jet ink composition containing a dissolved nitrogen amount of 5 ppm or more. Furthermore, the storage stability is also excellent.

On the other hand, the ink-receiving bodies of Comparative Examples which are different from that of this embodiment were all inferior in terms of ejection evaluation.

5. REFERENCE EXAMPLES

In Reference Examples 1 to 5, as is the case of Examples, the ink-receiving bodies were formed and evaluated by the methods described above. The component of the ink jet ink composition, the storage method in the receiving body, and the evaluation result are shown in TABLE 5. From TABLEs 1 to 5, it is found that the problem of the ejection stability may arise by the dissolved nitrogen amount in the ink-receiving body, the number of types of pigments, and the like.

What is claimed is:

1. An ink-receiving body comprising:

an ink jet ink composition; and a container to receive the ink jet ink composition, wherein the ink jet ink composition is an aqueous ink containing a pigment and a surfactant, the pigment includes at least two types of pigments having chemical structures classified into respective different groups, the surfactant includes a polysiloxane-based surfactant having an HLB value of 10 or more and an acetylene glycol-based surfactant having an HLB value of 6 to 10, and the received ink jet ink composition contains a dissolved nitrogen amount of 5 ppm or more.

2. The ink-receiving body according to claim 1, wherein when a content of the acetylene glycol-based surfactant and a content of the polysiloxane-based surfactant are represented by B and A, respectively, a mass ratio (A/B) is 0.3 to 8.0.

3. The ink-receiving body according to claim 1, wherein the ink jet ink composition further contains an organic solvent having an SP value of 9 to 13.5 $(cal/cm^3)^{1/2}$.

4. The ink-receiving body according to claim 3, wherein when a content of the organic solvent is represented by C, the content C with respect to a total mass of the ink jet ink composition is 0.5 to 15 percent by mass.

5. The ink-receiving body according to claim 3, wherein when a content of the organic solvent and a content of the acetylene glycol-based surfactant are represented by C and B, respectively, a mass ratio (B/C) is 0.3 or less.

6. The ink-receiving body according to claim 1, wherein the container is an ink pack formed of a member having a multilayer structure or an ink bottle formed of a resin.

7. The ink-receiving body according to claim 1, wherein the container is an ink pack formed of a member having a multilayer structure or an ink bottle formed of a resin, the ink pack includes a resin film base layer and a gas barrier layer, and the gas barrier layer includes at least one selected from the group consisting of a gas barrier resin layer and a layer of a metal or a metal compound having a film thickness of 500 nm or less.

8. The ink-receiving body according to claim 1, wherein the container is an ink pack formed of a member having a multilayer structure or an ink bottle formed of a resin, the ink pack includes a resin film base layer and a gas barrier layer, the gas barrier layer includes at least one selected from the group consisting of a gas barrier resin layer and a layer of a metal or a metal compound having a film thickness of 500 nm or less, and the layer of a metal or a metal compound is a deposited layer.

9. The ink-receiving body according to claim 1, wherein the dissolved nitrogen amount is 5 to 20 ppm.

10. The ink-receiving body according to claim 1, wherein the container has a volume of 800 mL or more.

11. The ink-receiving body according to claim 1, wherein the pigment includes at least two types of pigments having chemical structures classified into respective different groups, the at least two types of pigments being selected from the group consisting of an azo-based compound, a quinacridone-based compound, a dioxazine-based compound, a perinone-based compound, a perylene-based compound, and a diketopyrrolopyrrole-based compound.

12. The ink-receiving body according to claim 1, wherein the pigment includes a first pigment compound which is an azo-based compound and at least one type of second pigment compound selected from the group consisting of a quinacridone-based compound, a dioxazine-based compound, a perinone-based compound, a perylene-based compound, and a diketopyrrolopyrrole-based compound.

13. The ink-receiving body according to claim 1, wherein when a content of the polysiloxane-based surfactant is represented by A, the content A with respect to a total mass of the ink jet ink composition is 0.3 to 1.5 percent by mass.

14. The ink-receiving body according to claim 1, wherein when a content of the acetylene glycol-based surfactant is represented by B, the content B with respect to a total mass of the ink jet ink composition is 0.1 to 1.0 percent by mass.

15. The ink-receiving body according to claim 1, wherein the ink jet ink composition has a yellow-reddish hue.

16. The ink-receiving body according to claim 1, wherein when a content of the acetylene glycol-based surfactant and a content of the polysiloxane-based surfactant are represented by B and A, respectively, a mass ratio (A/B) is 1.2 to 4.0.

17. An ink jet recording method comprising:

an adhesion step of ejecting the ink jet ink composition supplied from the ink-receiving body according to claim 1 from an ink jet head so as to be adhered to a recording medium.

18. The ink jet recording method according to claim 17, wherein the container is an ink bottle, and the ink jet recording method is performed using a recording apparatus including an ink tank having an ink charge port through which the ink jet ink composition is charged therein from the ink bottle and an ink jet head to which the ink jet ink composition is supplied from the ink tank.

* * * * *